US008718198B2

(12) United States Patent
Williams et al.

(10) Patent No.: US 8,718,198 B2
(45) Date of Patent: May 6, 2014

(54) MULTIPURPOSE TELEVISION MODULE (75) Inventors: George Williams, Carlsbad, CA (US); Xudong Yu, San Diego, CA (US); Toshiro Ozawa, San Diego, CA (US); Rolf Toft, San Francisco, CA (US); Leo M. Pedlow, Jr., Ramona, CA (US); Brant L. Candelore, Escondido, CA (US); David Boyden, Escondido, CA (US); Robert Blanchard, Escondido, CA (US); Christopher Jensen Read, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 696 days.

(21) Appl. No.: 12/592,703

(22) Filed: Dec. 1, 2009

(65) Prior Publication Data
US 2010/0083337 A1  Apr. 1, 2010

Related U.S. Application Data (63) Continuation of application No. 11/365,016, filed on Mar. 1, 2006, now Pat. No. 7,649,949, and a continuation-in-part of application No. 11/297,588, filed on Dec. 8, 2005, now Pat. No. 7,593,469.

(60) Provisional application No. 60/703,398, filed on Jul. 28, 2005, provisional application No. 60/736,698, filed on Nov. 14, 2005, provisional application No. 60/723,743, filed on Oct. 4, 2005.

(51) Int. Cl.
*H04L 27/06* (2006.01)

(52) U.S. Cl.
USPC .............. 375/340; 375/240.01; 375/240.26; 375/257; 375/324; 725/30; 725/31; 725/82; 725/85; 725/112

(58) Field of Classification Search
CPC ............. H04N 21/443; H04N 21/418; H04N 21/4181; H04N 21/4183; H04N 21/426; H04N 21/4431; H04N 21/4433; H04N 21/4437; H04N 21/4367
USPC ......... 375/257, 259, 262, 295, 316, 324, 340, 375/260; 725/6, 25, 30, 31, 74, 78, 100, 725/109, 112, 113, 131–133, 139; 719/328; 718/100
See application file for complete search history.

(56) References Cited

U.S. PATENT DOCUMENTS 7,587,740 B2 * 9/2009 Yun ............................... 725/107
7,607,159 B2 * 10/2009 Yun ............................... 725/107
(Continued)

OTHER PUBLICATIONS

"Multi-Stream CableCard Interface (OC-SP-MC-IF-C01-050331)", Mar. 31, 2005, Cable Television Laboratories, pp. 1-147.*
(Continued)

*Primary Examiner* — Sophia Vlahos
(74) *Attorney, Agent, or Firm* — Sony Corporation (57) ABSTRACT

A method of processing a boot sequence for a processor forming a part of a module apparatus involves interrogating a host television device to determine if the host television device requires use of an application execution engine residing on the module apparatus; receiving a reply to the interrogation; and responsive to the reply, establishing a mode of operation wherein the application execution engine is used to execute application code for the host television device. This abstract is not to be considered limiting, since other embodiments may deviate from the features described in this abstract.

11 Claims, 5 Drawing Sheets

(56) References Cited

U.S. PATENT DOCUMENTS

| | | | |
|---|---|---|---|
| 8,429,461 B2* | 4/2013 | Park | 714/43 |
| 2003/0084440 A1* | 5/2003 | Lownes | 725/6 |
| 2004/0117817 A1 | 6/2004 | Kwon et al. | |
| 2004/0139480 A1 | 7/2004 | Delpuch et al. | |
| 2005/0028157 A1* | 2/2005 | Betancourt et al. | 718/100 |
| 2005/0034123 A1* | 2/2005 | Shiomi et al. | 718/1 |
| 2005/0047596 A1 | 3/2005 | Suzuki | |
| 2005/0053090 A1 | 3/2005 | Harada et al. | |
| 2005/0081218 A1 | 4/2005 | Acott et al. | |
| 2005/0114905 A1* | 5/2005 | Song | 725/132 |
| 2005/0138213 A1* | 6/2005 | Lee et al. | 709/250 |
| 2005/0204391 A1* | 9/2005 | Hunleth et al. | 725/78 |
| 2005/0246707 A1 | 11/2005 | Ismail et al. | |
| 2005/0280742 A1 | 12/2005 | Jaffe | |
| 2006/0020950 A1* | 1/2006 | Ladd et al. | 719/328 |

OTHER PUBLICATIONS

Tanner "Implementing an OCP iDCR—An Alternate Approach", Presentation at CEA meeting, Denver CO, Jan. 20, 2005.*

"Multi-Stream CableCard Interface" (OC-SP-MC-IF-C01-050331), Mar. 31, 2005, pp. 1-147.*

ANSI/SCTE 28 "Host-POD Interface Standard", 2004, pp. 1-229.*

Tanner, "Implementing an OCAP iDCR—An Alternate Approach", Sharp Presentation at CEA Meeting, Jul. 20, 2005, Denver, CO.

Overview of Ocap Support on the Moxi Media Center, Diego Inc., Jun. 2004.

Panasonic Demonstrates World's First Interactive, OCAP-Based Cable System, Panasonic Press Release, Jan. 8, 2004.

* cited by examiner

MULTIPURPOSE TELEVISION MODULE

CROSS REFERENCE TO RELATED DOCUMENTS

This application is a continuation of U.S. patent application Ser. No. 11/365,016 filed Mar. 1, 2006 now U.S. Pat. No. 7,649,949 and is related to and claims priority benefit of U.S. Provisional Patent Application No. 60/703,398, filed Jul. 28, 2005, No. 60/736,698 filed Nov. 14, 2005 and No. 60/723,743 filed Oct. 4, 2005 now U.S. Pat. No. 7,593,469, and is a continuation in part of U.S. patent application Ser. No. 11/297,588 filed Dec. 8, 2005 now U.S. Pat. No. 7,593,469, all of which are hereby incorporated herein by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

CableCARD™ devices (also known as PODs—Point Of Deployment modules) are designed for use in the US cable industry to provide conditional access functions to retail devices such as television set-top boxes, VCRs, PVRs, and television receivers. In Europe, Digital Video Broadcasting (DVB) conditional access modules (CAMs) similarly are used not only in cable, but also terrestrial and satellite applications. For purposes of this document, terminology for all such devices will be used interchangeably. The first generation of such devices was designed to accommodate a single stream of video data. Subsequently, in the US, the "OpenCable™ Specifications: Multi-Stream CableCARD™ Interface OC-SP-MC-IF-C01-050331" from CableLabs Corp. has been introduced to provide multi-stream capability for CableCARD™ devices. Briefly, the CableCARD™-Host interface specification defines the interface between a digital cable host device and the CableCARD™ device. The Multi-Stream CableCARD™ device (also called an "M-CARD") is a second generation CableCARD™ device (single stream CableCARD™ devices are also called "S-CARDs"). A multi-tuner Host can pass multiple transport streams through an M-CARD device. The above document defines an M-CARD device that can support multiple transport streams. The M-CARD device described in the above document is backward compatible with single stream CableCARD™ devices as defined via [SCTE28], the Host-POD Interface Standard [OC-CC] and the POD Copy Protection System [SCTE41], and supports multiple program decryption from multiple transport streams. The above-referenced documents are hereby incorporated herein by reference.

The OCAP (OpenCable™ Applications Platform) specifies a mechanism for Java™ programs to run, for example, to implement functions such as an electronic program guide, Video-on-Demand (VOD), and Personal Video Recorder (PVR). However, it is noted that although Java™ is designed to be a language that can be written once and then ported to many different processing environments, the reality is quite different and many problems can be encountered when attempting to run Java™ code on multiple environments. For example, when Java™ code is generated and debugged in a first operational environment, it may not function properly in a second operational environment. Therefore, for OCAP to become widely accepted, the Java™ code should be functional on every platform on which it is to run. This conceivably means each set of code must be individually tested with each hardware platform from all manufacturers in order to assure that the code functions properly.

The High Definition Multimedia Interface (HDMI) is a specification for uncompressed, copy protected, digital video and audio. It supports enhanced or high definition video plus multiple audio channels, and for example, can provide a link between a source of A/V content and a display.

The OpenCable™ Unidirectional Receiver (OCUR) specification (OC-SP-OCUR-101-060109) describes a proposed host device that may be interoperable across cable systems used throughout North America. It wraps MPEG2 transport streams in Internet Protocol (IP) packets. Content is conditional access (CA) descrambled in the OCUR and re-encrypted using Digital Rights Management (DRM). Some copy protection technologies include Dynamic Feedback Arrangement Scrambling Technique (DFAST) used with POD copy protection in existing S-CARDs and M-CARDs, Digital Transmission Content Protection (DTCP) used with IEEE1394, and High Bandwidth Content Protection (HDCP) used with High Definition Multimedia Interface (HDMI). As of this writing, CableLabs has proposed the Downloadable Conditional Access System (DCAS) which seeks to eliminate the use of both S-CARDs and M-CARDs. DCAS will allow conditional access (CA) functionality, e.g. from MediaCipher™ from Motorola or PowerKey™ from Scientific Atlanta, to be downloaded from the cable headend to a security integrated circuit (IC) mounted on the motherboard of the receiver in a customer's home.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "code", as used herein, is defined as a sequence of instructions designed for execution on a computer system. A "program", "code", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In one embodiment consistent with the present invention, a CableCARD™ (S-CARD or M-CARD) can be modified to provide a video signal line to provide video graphics, e.g. electronic program guide or VOD application user interface, output by incorporating an OCAP (OpenCable™ Applications Platform) engine and stack. The resulting card can be utilized to carry out OCAP specified functions in a single CableCARD™ device. And, it is envisioned that DCAS might eventually be deployed whereby conditional access decryption would no longer be done in the CableCARD. In such a scenario, the module might still be useful to manage OCAP and other functions. In such an embodiment, generally four video output lines can be provided to output RGB and alpha changes in order to provide an appropriate output for integration into a display.

OCAP specifies a mechanism for Java™ programs to run, for example, to implement functions such as graphics functions and other video content. However, it is noted that although Java™ is designed to be a language that can be written once and then ported to many different processing environments, the reality is quite different and many problems can be encountered when attempting to run Java™ code on multiple environments. By placing the OCAP engine and stack on a single processor used in conjunction with an S-CARD or M-CARD, these problems can be avoided, since a common platform is available for use across multiple hosts. In other embodiments, the OCAP module can be a single purpose device used for the purpose of standardizing the OCAP engine across multiple and various hosts. In yet other embodiments, other functionality can be combined with the OCAP module.

Figure 1:
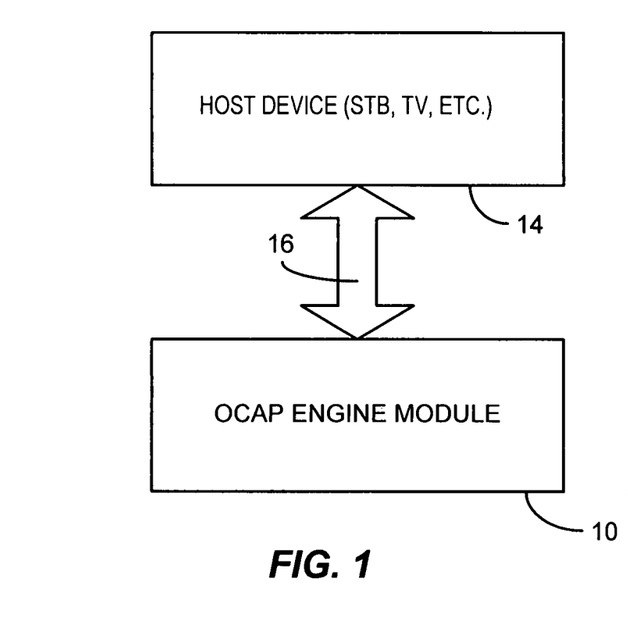
FIG. 1 shows a first embodiment of an OCAP module consistent with certain embodiments of the present invention.

FIG. 1 depicts one embodiment consistent with the present invention wherein an OCAP engine module 10 is coupled to a host device 14 (set-top box, television receiver, VCR, PVR, etc.) via an interface 16 and thereby provides the OCAP functionality for the host device 14. In this embodiment, the OCAP engine module 10 provides the benefit of having a single Java™ environment that can be used for operation across multiple hosts (such as 14 or other hosts with interface 16), which can be adapted to run the Java™ code using the OCAP module 10 and thus benefit from use of a single Java™ environment. The code writer also benefits by virtue of having to only test code in a single Java™ environment.

Figure 2:
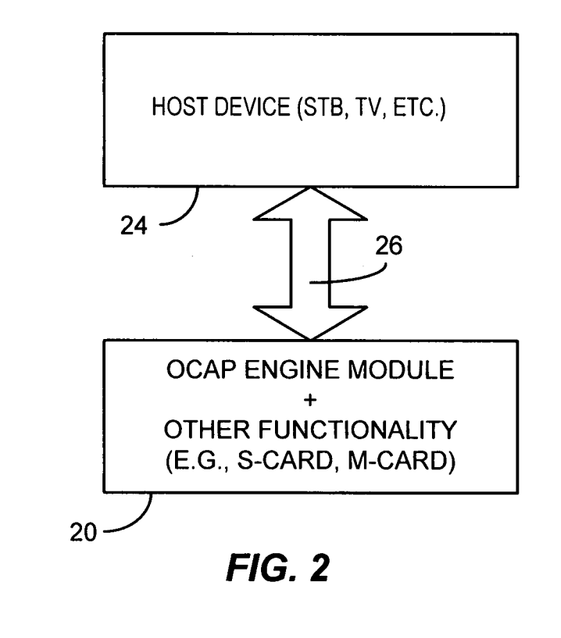
FIG. 2 shows a second embodiment of an OCAP module combined with other functionality in a manner consistent with certain embodiments of the present invention.

FIG. 2 generically depicts an OCAP engine module 20 combined with other functionality such as M-CARD or S-CARD functionality. Such a module 20 has similar benefits to that of FIG. 1, but is also adapted to operate to provide M-CARD or S-CARD functionality (or some other functionality) in addition to providing an OCAP engine, API, Hardware drivers, OCAP stack, etc. as needed to support the Java™ operating environment.

Figure 3:
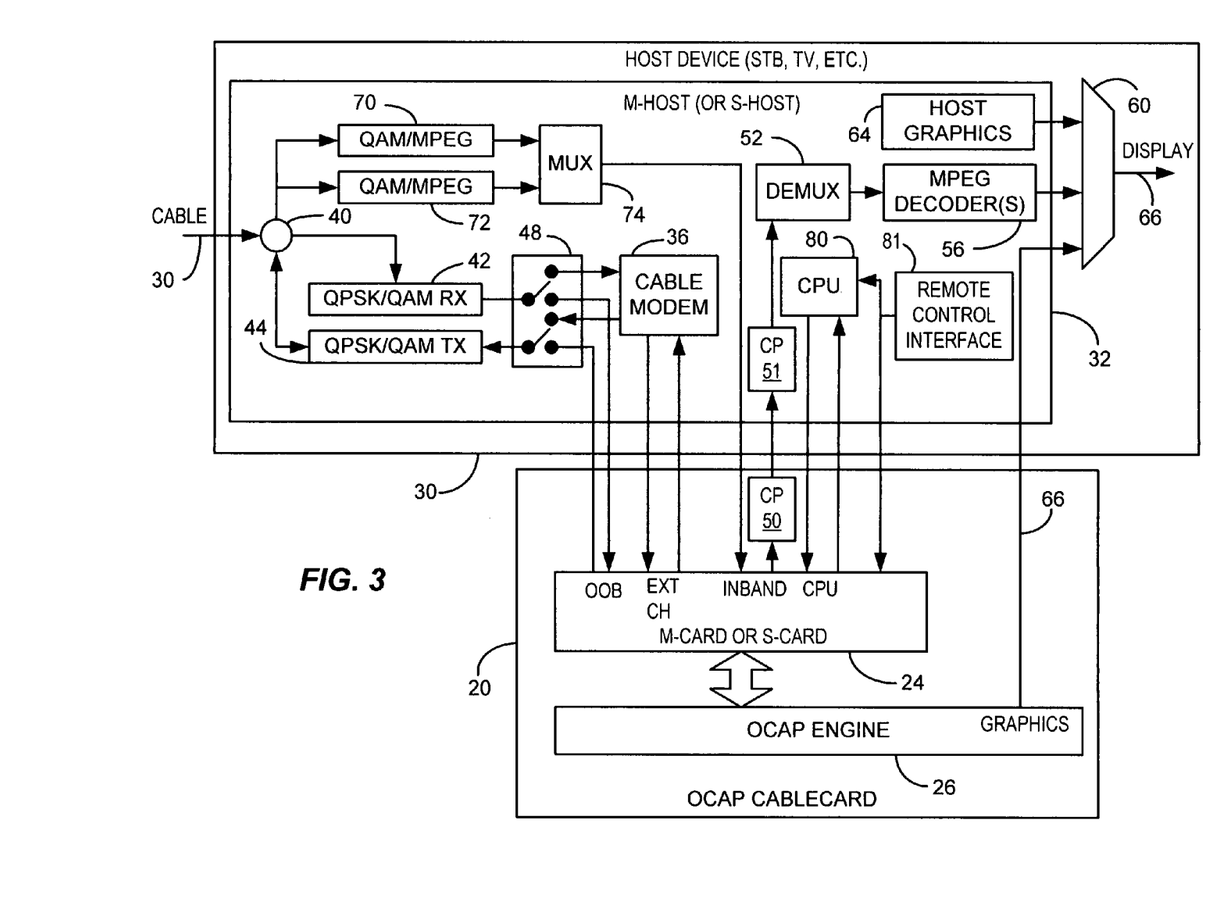
FIG. 3 shows an embodiment of an OCAP engine incorporated into an M-CARD or S-CARD in a manner consistent with certain embodiments of the present invention.

FIG. 3 shows a more detailed view of one embodiment of module 20 carrying an M-CARD or S-CARD 24 adapted to carry an OCAP engine 26 and associated functionality. An M-CARD or S-CARD provides interfaces coupling out of band (OOB) data communication with the host device 30, which contains an M-HOST or S-HOST 32, as well as communication with the host cable modem 36 (or similar if present). OOB data is communicated from the cable 38 via a diplexer or other combining circuit 40 using, for example a QPSK/QAM receiver 42 and transmitter 44. The data to and from transmitter 44 and receiver 42 can be selectively switched within the host device 30 via switches 48. In this manner, the OCAP CableCARD™ 20 can communicate either directly via the out of band channel or via the cable modem 36.

Inband data are also received by the M-CARD or S-CARD in order to carry out the conditional access functions such as decryption and the resultant decrypted output is then encrypted at copy protection (CP) encrypter 50 before being output over the interface using DFAST copy protection, for example. The encrypted signal is then copy protection (CP) decrypted at CP decrypter 51 in the host, and provided to a demultiplexer 52 for decoding by one or more MPEG decoders 56. The decoded output of decoder(s) 56 is then provided to multiplexer 60. Multiplexer 60 combines the decoded output with graphics from host graphics engine 64 and graphics at 66 produced by the OCAP engine 26. Multiplexer 60 drives an internal or external display or other device at output 66 (depending upon the nature of the host).

The inband programming along with other information is received from the cable 38 through circuit 40 as QAM/MPEG data at, for example, receiver devices 70 and 72 which are multiplexed together for an M-CARD environment at multiplexer 74. For an S-CARD environment, only one receiver device 70 is needed, demultiplexer 52 can be omitted and only one MPEG decoder 56 is used.

The OCAP engine 26 on the CableCARD™ receives Java™ code, which are generally stripped from the transport stream, from the M-CARD interface (which may be received via either OOB, Inband or Cable Modem channels) and generates the appropriate operation dictated by the code. If such operation involves generation of graphics, such graphics data are supplied at line 66 to the multiplexer 60 for presentation on the display as previously described. Other functions can also be implemented using the Java™ code and such instructions can be carried out via appropriate communication between the OCAP engine 26 and the M-CARD or S-CARD 24 which may in turn provide instructions to the host CPU 80, demultiplexer 52, cable modem 36 or out of band channel. Host CPU 80 also receives commands from a remote controller (not shown) via a remote controller interface 81. OCAP module 24 receives signals from interface 81 in order to process commands from the remote controller. The CPU 80 to module 24 interface could also be used to convey this information, but might result in the OCAP code for this module not being the same as for regular set top boxes.

Figure 4:
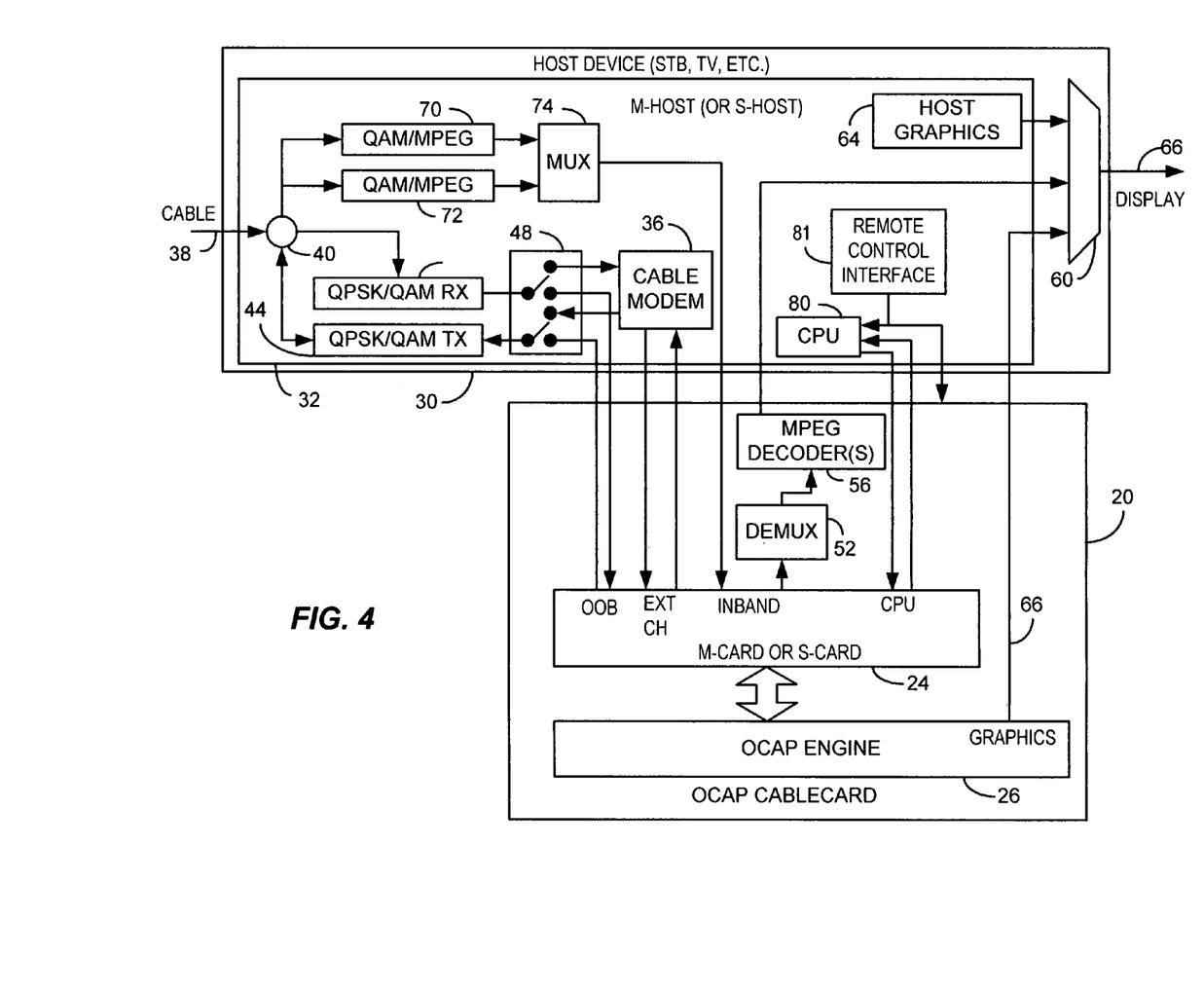
FIG. 4 shows another embodiment of an OCAP engine incorporated into an M-CARD or S-CARD in an embodiment wherein the MPEG decoder(s) and a demultiplexer is incorporated into the PCMCIA form factor card consistent with certain embodiments of the present invention.

Conventional CableCARDs™ utilize a PCMCIA interface that can be configured in various ways. Such interfaces do not generally provide for lines 66, so the current modification contemplates the likely use of a new interface that is similar to the PCMCIA connector with the addition of four lines for Red, Green, Blue and alpha data (or other representation for video without limitation). This will permit the full functionality of CableCARD™ devices with the additional functionality of the OCAP engine. The presence of such a connector is depicted in FIG. 3 and FIG. 4 as the presence of connections between the host and the OCAP CableCARD™. Such connector is contemplated to provide for a removable connection between the module and the host in much the same way as a standard PCMCIA connector provides, except with the addition of the video connections described above.

FIG. 4 depicts another embodiment in which an OCAP enabled CableCARD™ which also incorporates the functions of the M-CARD (or S-CARD) as well as the demultiplexer 52 (for M-CARD) and MPEG decoding functions (one decoder 56 for S-CARD, plural decoders 56 for M-CARD). This embodiment differs from that of FIG. 3 in that the demultiplexer 52 and decoder(s) 56 are a part of the CableCARD™ 20. Additionally, the display may be either internal or external in either embodiment depending upon the nature of the host. In Other variations will occur to those skilled in the art upon consideration of the present teaching.

Thus, embodiments consistent with the present invention provide a mechanism of implementing the OCAP execution engine on a CableCARD™ (or other module) while maintaining backwards compatibility with the OpenCable™ Multi-Stream or single stream CableCARD™ Interface Specification. This facilitates the creation of an "OCAP Ready" TV receiver or similar host device with an enhanced version of the CableCARD™ slot. An OCAP CableCARD™ could be provided separately from the receiver which would make the receiver OCAP compliant. Extensions to the CableCARD™ interface are used to support graphics output from the CableCARD™ and to allow control of the TV middleware such as tuners, from applets running on the CableCARD™. Embodiments consistent with the invention may allow the MSO the opportunity to dramatically reduce testing costs by reducing the variety of different OCAP platforms attached to their network.

Embodiments can be proposed to the US Cable Industry as a deployment method for OCAP, and an alternative to embedding the OCAP stack in products. This could result in wide deployment in the US. OCAP is based on the Multimedia Home Platform (MHP) standard for open middleware used in Digital Video Broadcasting (DVB) deployed in Europe and extensions thereof. ARIB (Association of Radio Industries in Business) in Japan will also be based on MHP. OCAP is deployed in Korea. Any situation where Java™ interoperability is desired could use a similar concept to help solve interoperability problems. Thus, while the embodiments herein are described in conjunction with OCAP, they are equally applicable to other software execution environments including, but not limited to HMP used in connection with a DVB Conditional Access Module (CAM).

Thus, an apparatus for facilitating use of OCAP (OpenCable™ Applications Platform) standard in a host cable television device, the host cable television device having a connector consistent with certain embodiments has a removable module. While the current form factor for CableCARD and CAM are PCMCIA, in the future, use of faster and more capable interfaces such as USB 2.0 or Giga-bit Ethernet should not be precluded. Power Line communications might allow Internet Protocol traffic through the electrical cord. It may be possible for the module to reside anywhere in the local home network and not physically collocated with the host TV device. An OCAP engine resides on the removable module suitable for execution of Java™ code as specified by the OCAP specification. A module side connector is affixed to the removable module, the connector being suitable for mating with the connector of the host device. The module side connector has connections suitable for carrying graphics video data from the OCAP engine to the host device suitable presentation to a video display. The module side connector further has connections suitable for carrying Java™ code instructions to the OCAP engine for execution.

Another embodiment of an apparatus for facilitating use of OCAP (OpenCable™ Applications Platform) standard in a host cable television device, the host cable television device having a connector consistent with the invention has a removable module. An OCAP engine resides on the removable module suitable for execution of Java™ code as specified by the OCAP specification. A module side connector is affixed to the removable module, the connector being suitable for mating with the connector of the host device. The module side connector has connections suitable for carrying graphics video data from the OCAP engine to the host device suitable presentation to a video display. The module side connector further has connections suitable for carrying Java™ code instructions to the OCAP engine for execution. Circuitry implementing OpenCable™ M-CARD conditional access functions resides on the removable module. The module side connector further has connections suitable for carrying M-CARD compatible signals.

Another embodiment of an apparatus for facilitating use of OCAP (OpenCable™ Applications Platform) standard in a host cable television device, the host cable television device having a connector to accommodate a removable module. An OCAP engine resides on the removable module suitable for execution of Java™ code as specified by the OCAP specification. A module side connector is affixed to the removable module, the connector being suitable for mating with the connector of the host device. The module side connector has connections suitable for carrying graphics video data from the OCAP engine to the host device suitable presentation to a video display. The module side connector further has connections suitable for carrying Java™ code instructions to the OCAP engine for execution. Circuitry implementing OpenCable™ S-CARD conditional access functions resides on the removable module. The module side connector further has connections suitable for carrying M-CARD compatible signals.

A further embodiment of an apparatus for facilitating use of OCAP (OpenCable™ Applications Platform) standard in a host cable television device, the host cable television device having a connector has a removable module. An OCAP engine resides on the removable module suitable for execution of Java™ code as specified by the OCAP specification. A module side connector is affixed to the removable module, the connector being suitable for mating with the connector of the host device. The module side connector has connections suitable for carrying graphics video data from the OCAP engine to the host device suitable presentation to a video display. The module side connector further has connections suitable for carrying Java™ code instructions to the OCAP engine for execution. Circuitry implementing OpenCable™ M-CARD conditional access functions resides on the removable module. The module side connector further has connections suitable for carrying M-CARD compatible signals. The Java™ code instructions are relayed to the OCAP engine through the circuitry that implements the OpenCable™ M-CARD conditional access functions. A demultiplexer receives MPEG data from the host cable television device via the circuitry that implements the OpenCable™ M-CARD functions. A plurality of MPEG decoders receive and decode the plurality of MPEG video data streams from the demultiplexer.

Yet a further apparatus consistent with certain embodiments for facilitating use of OCAP (OpenCable™ Applications Platform) standard in a host cable television device, the host cable television device having a connector has a removable module. An OCAP engine resides on the removable module suitable for execution of Java™ code as specified by the OCAP specification. A module side connector is affixed to the removable module, the connector being suitable for mating with the connector of the host device. The module side connector has connections suitable for carrying graphics video data from the OCAP engine to the host device suitable presentation to a video display. The module side connector further has connections suitable for carrying Java™ code instructions to the OCAP engine for execution. Circuitry implementing OpenCable™ S-CARD conditional access functions resides on the removable module. The module side connector further has connections suitable for carrying M-CARD compatible signals. The Java™ code instructions are relayed to the OCAP engine through the circuitry that implements the OpenCable™ S-CARD conditional access functions. An MPEG decoder receives and decodes an MPEG video data streams from the host cable television device.

Certain embodiments help reduce problems inherent in OCAP interoperability testing by decoupling the Java™ execution from the host device CPU, putting it under control of network operator and thus allowing them to control the number of client platforms they need to test on.

It is difficult for service providers to upgrade the codec in use in a delivery system without obsolescing receivers. In the future, cable receiver functionality may be predominantly supplied through retail set-top boxes and TVs. The module such as a CableCARD™ (CC) or CAM will be crucial in adapting the receiver to the network. In such an instance, service providers who wish to change the codec (compression) used on content in a system in order to recapture bandwidth can be readily accommodated by use of embodiments consistent with the present invention.

Figure 5:
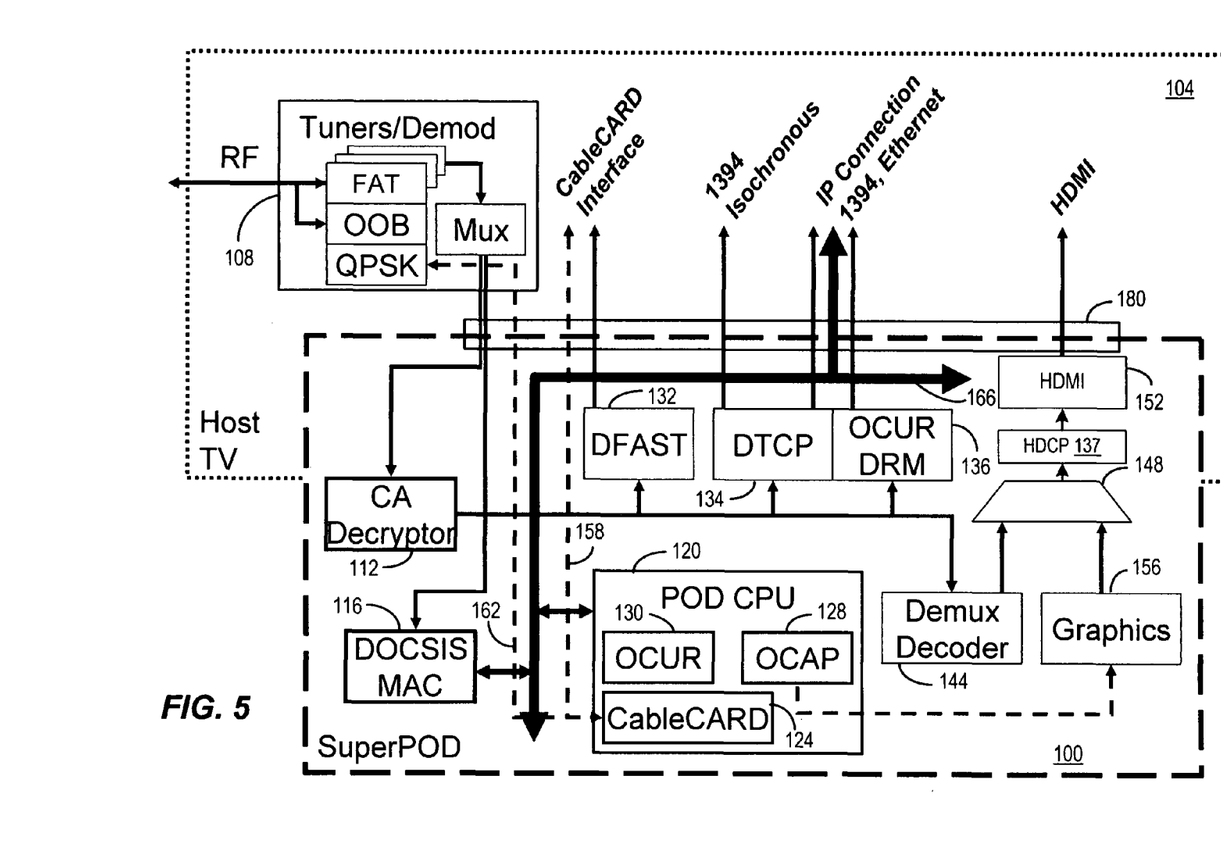
FIG. 5 shows an example embodiment of a multi-function POD card consistent with certain embodiments.

The present invention, in accordance with certain embodiments, can also be extended to embodiments such as that shown in FIG. 5 to produce a "SuperPOD" capable of M-Card, S-card (the currently required capability) and optionally OCAP, IEEE1394, OCUR and HDMI functionality. With the OCUR functionality, content can be encrypted using Digital Rights Management, e.g. Windows Media DRM (Microsoft) or Marlin (Marlin Joint Development Association). In accordance with certain embodiments, the SuperPOD module would have a CableCARD PCMCIA form factor and be backward compatible to CableCARD™ (either or both M and S) specification. These are currently required by the FCC for the US cable operators to have. By stocking a single multi-function device, the SuperPOD described herein, the cable operator can purchase a single device which can meet their regulatory obligations and provide new functionality. The SuperPOD module serves as a multi-function module with dynamic pin assignment depending on host configuration. The host configuration can be probed at startup to determine the host capabilities. Uncompressed (HDMI) and compressed (TS) outputs can be provided in a fixed or selectable manner, and they can be output at the same time if desired.

The embodiment 100 shown in FIG. 5 takes advantage of miniaturization and integration of components to decompress content on the CableCARD™ (CC) used in the US (or Korea where they support CC) and in the Conditional Access Module (CAM) used in Europe. A decompressed signal is generated at 144 and copy protected at 137 and output the interface at 152 and output from the module 100 to the host 104. The CC and CAM pins in connector 180 can be redefined to allow the output of a decompressed and copy protected digital signal, e.g. HDMI, to a properly enabled host 104. This signal can have graphics 156 overlaid on the content or the graphics may be output separately. DVI is also a possibility; however, it does not handle (digital) audio.

In certain embodiments, only HDMI would be used. The SuperPOD can optionally have a means to send graphics information in a separate channel as described earlier (R, G, B and alpha data).

The RF input to the host front end 108 can supply inbound content to conditional access (CA) decrypter 112 and out of band (OOB) content to the DOCSIS (Data Over Cable System Interface Specification) MAC layer processor 116. The module 100 has an internal CPU 120 where CableCARD™ (S and/or M) processing is carried out at a software process 124. OCAP processing can be carried out as previously described in an OCAP software process 128 that executes an OCAP engine. OCUR processing is carried out at software process 130.

The output of the CA decrypter 112 can be supplied to any or all of the copy protection techniques, Dynamic Feedback Arrangement Scrambling Technique (DFAST) encrypter and interface 132 that further provides a CableCARD™ interface; a Digital Transmission Content Protection (DTCP) compliant encrypter with interface 134 using either an IP connection or an IEEE 1394 connection or Ethernet; a High Bandwidth Digital Content Protection (HDCP) block 137, for example, between the combiner 148 and HDMI 152 which is used to encrypt the content when using the HDMI connection 152, and an OpenCable™ Unidirectional Receiver (OCUR) Digital Rights Management (DRM) encrypter and interface 136 can produce an encrypted output at OCUR DRM interface 136 as an IP connection, IEEE 1394 connection or Ethernet. A common bus 140 provides inputs to DFAST 132, DTCP 134 and OCUR DRM 136 as well as a demultiplexer and decoder 144. For HDMI output, the decoded and demultiplexed output from demux decoder 144 is provided through combiner 148 to an HDCP encrypter 137 and then to the HDMI interface 152. Optionally, OCAP engine 128 can supply graphics content 156 to combiner 148 to be merged with the content from demux decoder 144 for output via HDMI interface 152 or it may be supplied separately using the R, G, B and alpha lines discussed previously. Operation of each of these functional blocks is controlled by processor 120.

Control signals and outbound upstream content is provided from the POD CPU 120 to the CableCARD™ interface at or to the outbound path of the receiver front end 108 directly. While not explicitly shown, a remote command pass through connection may be needed between the host 104 and the module 100 in certain embodiments. Internal bus 166 is used for delivering compressed content that has been wrapped in IP packets.

There are several possible methods for how to convey graphics. The examples described relate to sending graphics along with compressed content (multi-stream POD, 1394) but in certain embodiments, graphics can also be sent along with uncompressed content. Certain embodiments consistent with the present invention can be operated in a number of different modes, including but not limited to the following:

OCAP MODE A—Compressed and IP Mode—In this mode, which is primarily for high-end hosts with IP connection. An output transport stream TS can be provided over IP or 1394 isochronous. Multiple programs can be re-multiplexed for host-side picture-in-picture (PIP) and personal video recorder (PVR) (also known as digital video recorder (DVR)) applications. Content protection can be provided by use of DTCP 134 copy protection. A remote user interface (UI) can be provided over IP for OCAP applications (e.g., Java RMI, OpenGL primitives or VNC).

In OCAP MODE A, CA decrypter 112 and DOCSIS MAC 116 are active, as is the POD CPU 120 (operating the CableCARD™ software 124 and possibly OCAP process 128). Output to the host is via the CableCARD™ interface.

OCAP MODE B—Uncompressed—In this mode an "OCAP-in-a-POD" function is carried out with HDMI compatible uncompressed output (AV+OCAP GUI) from HDMI interface 152. This mode is primarily useful for mid- to low-end TVs operating as the host. In certain embodiments, PIP can be done inside the module. The IEEE 1394 interface can be used for OCAP DVR functionality where slave storage is provided by the host. Compressed content is sent to and received from the DVR on the host, however the host does not render the content itself.

In this mode, CA decryptor 112 decrypts content which is output copy protected using DTCP interface 134. DOCSIS MAC block 116 is also operational in this mode along with the POD CPU 120 including the CableCARD™ module 124 and OCAP module 128. Decrypted output and decrypted content returning from the DVR on the host are also supplied to demux decoder 114 for combination with OCAP graphics 156 at combiner 148 and output via HDMI interface 152.

In either of the above cases, the module can function as either an M-Card or an S-Card, in certain embodiments, depending on host configuration.

OCUR MODE—In this mode the module 100 can be configured as an OCUR compliant device using IP connection to the host 104. It is anticipated that use in this mode is unidirectional only until the OpenCable Bidirectional Receiver "OCBR" specification is finalized. At that point, bidirectionality can also be implemented. The use of the term OCUR in this document is intended to embrace either implementation. This mode can be configured as multiple virtual OCUR devices for multi-tuner hosts.

In this mode, only the CA decryptor 12 and OCUR DRM interface 136, along with the POD CPU 120 operating as a controller is used. Output to the host 104 is via IP Connection—IEEE 1394 and Ethernet.

Those skilled in the art will appreciate, upon consideration of the present teachings, that the exemplary embodiments are specific to the current U.S. Cable industry, but may be suitably modified to comply with other standards. For example, in Europe, the DVB CAM is used rather than a CableCARD™. However, the same concept can be implemented there as well for terrestrial, satellite and cable. In so doing, the multi-function module may take the form of a DVB Conditional Access Module (CAM) which uses MHP instead of OCAP. Similarly, in Europe, DFAST is not generally used, but some other type of copy protection may be substituted. Hence, in the present discussion, suitable substitutions can be used throughout without loss of generality.

Figure 6:
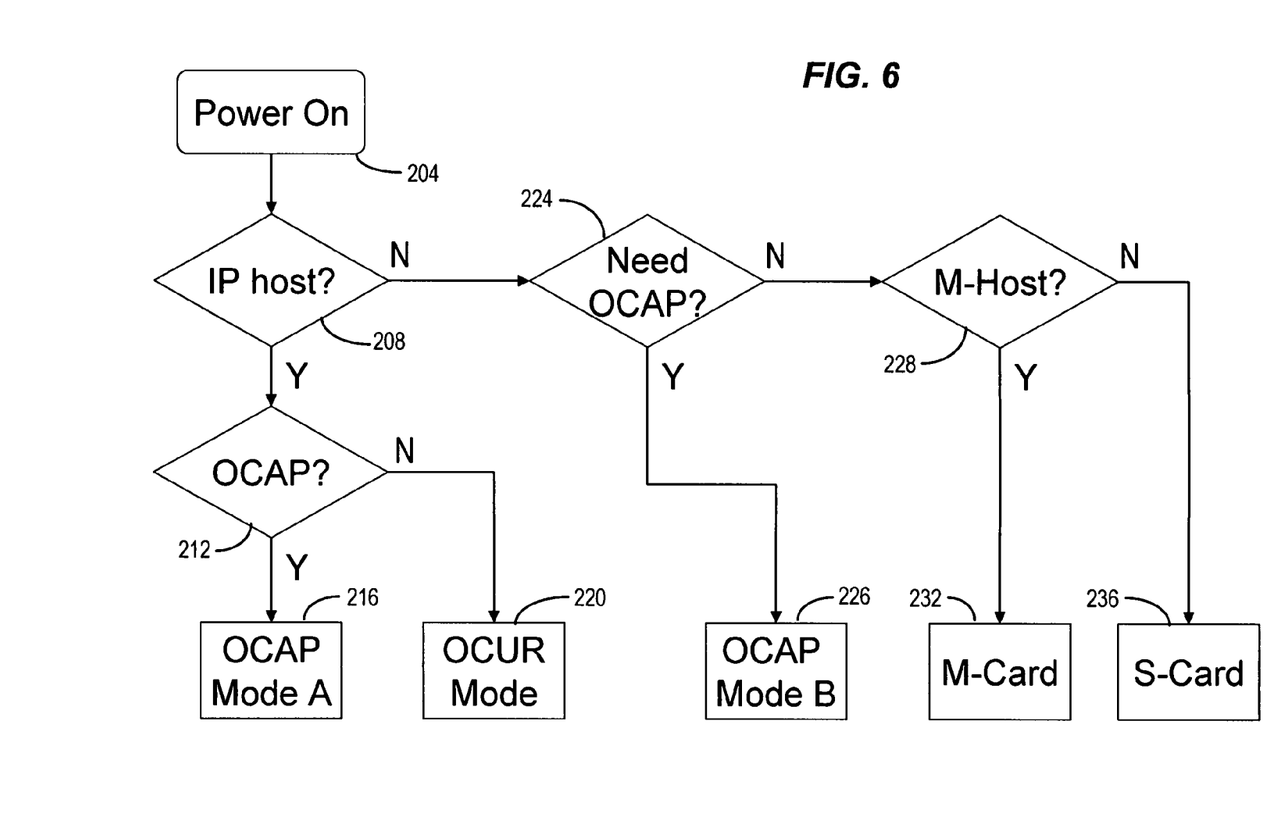
FIG. 6 shows an example embodiment of a boot sequence for a processor on a multi-function POD card consistent with certain embodiments.

The multi-function module 100 utilizes an initialization or Boot sequence (e.g., carried out by programmed processor 120) when installed into host 104 and/or at each power-up cycle of the host as depicted in FIG. 6 starting at power on 204. Module 100 next interrogates the host 104 to determine how the module 100 should be configured based upon the host's capabilities. At 208 the module 100 determines if the host is an IP host. If so, it next determines if OCAP capability is available in the host at 212. If so, the module 100 enters OCAP MODE A at 216, as described above. Otherwise, one way communication is implied and the OCCUR mode is established at 220 as described above. In either case, output to the host can be via IEEE 1394, Ethernet or other suitable IP connection.

If the host 104 is not an IP host at 208, the module 100 determines if OCAP capability is needed by the host 104 at 224. If so, OCAP MODE B is entered at 226 and the output transport stream is provided by IEEE 1394 (for slave storage to DVR on the host) or decompressed in the module and displayed via HDMI (with graphics overlaid).

If the host 104 does not need OCAP capability at 224, the module 100 determines if the host 104 is an M host or an S host at 228. If it is an M host, module 100 boots as an M-CARD at 232 and if the host 104 is an S host at 228, the module 100 boots as an S-CARD at 236. In both M-CARD and S-CARD modes, copy protection is handled by DFAST 132.

Also shown schematically in FIG. 5, is a configurable connector residing on the module 100, consistent with certain embodiments. It will be understood that part of the boot process according to certain embodiments entails assignment of pin connections for the module 100. This is readily carried out by use of an array of programmable switches that are configured by POD CPU 120 upon determination of the configuration that is to be established. Such an array of switches is disposed between each of interfaces 132, 134, 136 and 152 and the connector used to engage a mating connector of the host 104. Similarly, the array of switches may be used to properly connect blocks 112 and 116 as well as communication lines 158 and 162 to their respective mating connector pins. In order to facilitate carrying out the interrogation at boot up of the module 100, in certain embodiments, certain connections are to be reserved for power and ground pins, as well as at least one data pin for conducting the interrogation. However, other embodiments can be devised in which other interrogation techniques are utilized.

Since the host 104 identifies its native format & codec capability to module 100 at power-up, the following problems may be prevented: orphaned products through backward compatibility, additional cost caused by adding minimal features in basic level devices. Moreover, embodiments consistent with the present invention allow MSOs to introduce new network capabilities through card downloads or replacement.

Hence, embodiments consistent with the present invention provide a single solution for Multiple System Operators (MSOs) to provide separable security in a POD. The module 100 further is capable of supporting future initiatives while maintaining compatibility with existing POD enabled CE devices. The CE is allowed the greatest degree of product differentiation without feature limitations or cost in adding new requirements. This is accomplished while maintaining separation between cable network physical interfaces and management/security functions (PHY/MAC separation). Cable content can be provided to CE devices in formats appropriate to the host's capabilities, including but not limited to uncompressed video (HDMI) for display-oriented hosts, MPEG TS for devices with native decoding capability, and support for future codecs through on-card decoding & transcoding.

In certain embodiments, it is anticipated that the uncompressed content would be sent in a manner similar to HDMI. But it is noted that the CableCARD™ interface is very short in comparison to the design limits of HDMI. Since HDMI was designed for delivery over cables that might be as long as 9 ft, it may be possible to use a simpler interface to deliver the digital content, and such is contemplated in embodiments consistent with the present invention. Other variations will occur to those skilled in the art upon consideration of the present teachings.

It is further noted that the examples of encryption, DRM and unencrypted format should not be considered limiting since any other encryption, decryption, or unencrypted formats could be used in conjunction with embodiments consistent with the present invention.

Thus, in accordance with certain embodiments consistent with the present invention, a multi-function module apparatus for use in a host television device, the host cable television device having a connector has a removable module. An application execution engine resides on the removable module suitable for execution of code. A conditional access (CA) decrypter decrypts content entering the module using a conditional access decryption mechanism. A first encrypter selectively receives the decrypted content from the CA decrypter and re-encrypts the decrypted content. A second encrypter selectively receives the decrypted content from the CA decrypter and re-encrypts the decrypted content. A module side connector has a plurality of programmable connections, the connector being affixed to the removable module and suitable for mating with the connector of the host device. A processor resides on the module, the processor being programmed to configure a function of the connections after executing a boot sequence, the processor being further programmed to configure at least one of the first or second encrypters to encrypt the decrypted content from the CA decrypter. The processor further being programmed to enable or disable the application execution engine.

In certain embodiments, the multi-function module also has a third encrypter, wherein the processor is further programmed to configure at least one of the first or second or third encrypters to encrypt the decrypted content from the CA decrypter. In certain embodiments, the multi-function module also has connections suitable for carrying graphics video data from the application execution engine to the host device suitable presentation to a video display. In certain embodiments, the multi-function module also has connections suitable for carrying the code instructions to the application engine for execution. In certain embodiments, the multi-function module also has a content decoder and a decompressed interface for content, and wherein the processor is further programmed to configure the interface to pass the decompressed content to the host television device. In certain embodiments, the multi-function module also has a combiner that acts to overlay at least a portion of the unencrypted and decompressed content from the decoder with the graphics video data from the application execution engine so that both the decompressed content and the graphics video data are passed through the interface. In certain embodiments, the multi-function module also has a demultiplexer and decoder that processes the CA decrypted content prior to combining at the combiner. In certain embodiments, the connector can be any one of the following: Ethernet, Power Line, coax, USB, USB 2.0, PCMCIA, CableCARD™, Multi-stream CableCARD™, DVB CAM, and a special function connector that is designed specifically for the multifunction module. In certain embodiments, the multi-function module also has circuitry implementing at least one of the OpenCable™ M-CARD conditional access functions and the OpenCable™ S-CARD conditional access functions residing on the removable module. In certain embodiments, the processor's boot sequence comprises an interrogation of the host television device to determine certain of the host television device's capabilities. In certain embodiments, the application execution engine comprises a Java™ code execution engine. In certain embodiments, the application execution engine can be at least one of an OCAP compliant execution engine and an MHP compliant execution engine.

A multi-function module apparatus consistent with certain embodiments for use in a host television device, the host cable television device having a connector has a removable module. An OpenCable™ Applications Platform (OCAP) engine resides on the removable module suitable for execution of Java™ code as specified by the OCAP specification. A conditional access (CA) decrypter decrypts content entering the module using a conditional access decryption mechanism. A Dynamic Feedback Arrangement Scrambling Technique (DFAST) encrypter selectively receives the decrypted content from the CA decrypter and re-encrypts the decrypted content. A Digital Transmission Content Protection (DTCP) compliant encrypter selectively receives the decrypted content from the CA decrypter and re-encrypts the decrypted content. A module side connector has a plurality of programmable connections, the connector being affixed to the removable module and suitable for mating with the connector of the host device. A processor resides on the module and is programmed to configure a function of the connections after executing a boot sequence, the processor being further programmed to configure at least one of the DFAST or DTCP compliant encrypters to encrypt the decrypted content from the CA decrypter. The processor is further programmed to enable or disable the OCAP engine.

In certain embodiments, the multi-function module also has an Open Cable Unidirectional Receiver encrypter, wherein the processor is further programmed to configure at least one of the OCUR DRM or DFAST or DTCP compliant encrypters to encrypt the decrypted content from the CA decrypter. In certain embodiments, the module side connector has connections suitable for carrying graphics video data from the OCAP engine to the host device suitable presentation to a video display; and the module side connector has connections suitable for carrying Java™ code instructions to the OCAP engine for execution. In certain embodiments, the multi-function module also has a content decoder that receives content from the CA decrypter and a High Definition Multimedia Interface (HDMI), wherein the processor is further programmed to configure a fourth encrypter to encrypt the content using High Bandwidth Digital Content Protection (HDCP) to pass the encrypted content from the content decoder to the host television device. In certain embodiments, the multi-function module also has a combiner that functions to overlay at least a portion of the decompressed content with the graphics video data from the OCAP engine before being encrypted with HDCP and sent over the HDMI interface. In certain embodiments, the multi-function module also has a content decoder that receives content from the CA decrypter and a High Definition Multimedia Interface (HDMI), and wherein the processor is further programmed to configure the HDMI interface to pass at least a portion of the decompressed content from the decoder to the host television device. In certain embodiments, the multi-function module also has circuitry implementing at least one of the OpenCable™ M-CARD conditional access functions and the OpenCable™ S-CARD conditional access functions residing on the removable module. In certain embodiments, the processor's boot sequence involves an interrogation of the host television device to determine certain of the host television device's capabilities. In certain embodiments, the processor's boot sequence involves an interrogation of the host television device to determine if the host television device can receive content using Internet Protocol. In certain embodiments, the processor's boot sequence comprises an interrogation of the host television device to determine if the host television device has OCAP capabilities. In certain embodiments, the processor's boot sequence comprises an interrogation of the host television device to determine if the host television device needs OCAP functionality on the module. In certain embodiments, the processor's boot sequence involves an interrogation of the host television device to determine if the host television device is a Multi-stream host or a Single-stream host.

In accordance with certain embodiments, a multi-function module apparatus for use in a host television device, the host cable television device having a connector, has a removable module. An OpenCable™ Applications Platform (OCAP) engine resides on the removable module suitable for execution of Java™ code as specified by the OCAP specification. A conditional access (CA) decrypter decrypts content entering the module using a conditional access decryption mechanism. A content decoder decompresses the content. A Dynamic Feedback Arrangement Scrambling Technique (DFAST) encrypter selectively receives the decrypted content from the CA decrypter and re-encrypts the decrypted content. A Digital Transmission Content Protection (DTCP) compliant encrypter selectively receives the decrypted content from the CA decrypter and re-encrypts the decrypted content. An Open Cable Unidirectional Receiver approved-DRM encrypter selectively receives the decrypted content from the CA decrypter and re-encrypts the decrypted content. A High-bandwidth Digital Content Protection (HDCP) encrypter encrypts un-compressed content that is sent out the High Definition Multimedia Interface (HDMI). A module side connector has a plurality of connections, the connector being affixed to the removable module and suitable for mating with the connector of the host device. A processor resides on the module, the processor is programmed to execute a boot sequence, and after executing the boot sequence, the processor is further programmed to configure at least one of the OCUR DRM or DFAST or DTCP compliant encrypters to encrypt the decrypted content from the CA decrypter or the HDCP encrypter to encrypt un-compressed content from a decoder. The processor is also programmed to enable or disable the OCAP engine.

In certain embodiments, the multi-function module also has a combiner that overlays at least a portion of the decompressed content with the graphics video data from the OCAP engine prior to being passed through the HDMI interface. In certain embodiments, the multi-function module also has circuitry implementing at least one of the OpenCable™ M-CARD conditional access functions and the OpenCable™ S-CARD conditional access functions residing on the multi-function module apparatus. In certain embodiments, the processor's boot sequence interrogates the host television device to determine certain of the host television device's capabilities. In certain embodiments, the processor's boot sequence interrogates the host television device to determine if the host television device can receive content using Internet Protocol. In certain embodiments, the processor's boot sequence involves interrogation of the host television device to determine if the host television device has OCAP capabilities. In certain embodiments, the processor's boot sequence involves an interrogation of the host television device to determine if the host television device needs OCAP functionality on the multi-function module apparatus. In certain embodiments the processor's boot sequence involves an interrogation of the host television device to determine if the host television device is a Multi-stream host or a Single stream host.

In accordance with certain embodiments consistent with the present invention, a boot sequence for a processor residing on a multi-function module apparatus for use with a host television device, involves interrogating the host television device to determine if the host television device can receive a content stream using Internet Protocol (IP); if the host television device can receive a stream using IP, interrogating the host television device to determine if the host television device requires (OpenCable™ Application Platform) OCAP capabilities and establishing a first mode of OCAP operation of the multi-function module apparatus if the host television device requires OCAP capabilities; and establishing an OpenCable™ Unidirectional Receiver mode of operation of the multi-function module apparatus if the host television device does not have OCAP capabilities.

In certain embodiments, the boot sequence further involves: if the host television device cannot receive a content stream using IP, the processor's boot sequence further comprising an interrogation of the host television device to determine if the host television device needs OCAP functionality on the multi-function module apparatus, and if so, establishing a second mode of operation of the multi-function module apparatus. In certain embodiments, the boot sequence further involves an interrogation of the host television device to determine if the host television device is a Multi-stream host or a Single-stream host.

In certain embodiments, a boot sequence for a processor residing on a multi-function module apparatus for use with a host television device, involves interrogating the host television device to determine if the host television device can receive a stream using Internet Protocol (IP); if the host television device can receive a stream using IP, interrogating the host television device to determine if the host television device requires (OpenCable™ Application Platform) OCAP capabilities and establishing a first mode of OCAP operation of the multi-function module apparatus if the host television device requires OCAP capabilities, and establishing an OpenCable™ Unidirectional Receiver mode of operation of the multi-function module apparatus if the host television device does not have OCAP capabilities; if the host television device is not an IP host television device, the processor's boot sequence further comprising an interrogation of the host television device to determine if the host television device needs OCAP functionality on the multi-function module apparatus, and if so, establishing a second mode of operation of the multi-function module apparatus; and the processor's boot sequence further comprising an interrogating the host television device to determine if the host television device is a Multi-stream host or a Single-stream host.

In certain embodiments consistent with the present invention, a boot sequence for a processor residing on a multi-function module apparatus for use with a host television device, involves interrogating the host television device to determine if the host television device requires use of an application execution engine residing on the multi-function module apparatus; if so, establishing a mode of operation wherein the application execution engine is used to execute application code for the host television device; and if not, disabling the application execution engine in the multi-function module apparatus.

In certain embodiments, the application engine is a Java™ code execution engine. In certain embodiments, the application engine is at least one of an (OpenCable™ Application Platform) OCAP application engine and a Multimedia Home Platform (MHP) application execution engine. In certain embodiments, the boot sequence further involves an interrogation of the host television device to determine if the host television device is a Multi-stream host or a Single-stream host.

In accordance with certain embodiments consistent with the present invention, an external module for use with a host television device (the host television device receiving at least one content service) has a connector for attaching the module to the host television device, wherein Java™ code received from the content service is passed over the connector to the external module by the host television device. An application execution engine resides on the external module and is suitable for execution of the Java™ code.

In certain embodiments, the external module further conveys graphical information generated by the application execution engine to the host television device for rendering on a television display. In certain embodiments, the external module further conveys content comprising at least one of tuning, storage, usage, and trick-play commands generated by the application execution engine to the host television device. In certain embodiments, the external module further receives and responds to remote control commands from the host television device. the connector is one of the following: Ethernet, Power Line, coax, USB, USB 2.0, PCMCIA, Cable-CARD, Multi-stream CableCARD, DVB CAM, and a special function connector. In certain embodiments, the external module performs conditional access (CA) descrambling of the content. In certain embodiments, the external module further performs copy protection on compressed content that is returned as it follows back to the host television device. In certain embodiments, the copy protected content is sent back to the host as at least one of IEEE1394, CableCARD, DVB CAM, and OCUR/DRI format. In certain embodiments, the compressed content but un-copy protected content is sent back to the host in IEEE1394, CableCARD format, DVB CAM and OCUR/DRI format. In certain embodiments, the external module further decompresses the content and creates a composite signal sent back to the host TV device. In certain embodiments, the external module further has the graphics data obtained from processing the Java™ code is first overlaid on the decompressed signal. In certain embodiments, the graphics data obtained from processing the Java™ code is output separately from the decompressed signal. In certain embodiments, the composite signal sent back to the host device conforms to one of HDMI and DVI.

An external module for use with a host television device consistent with certain embodiments wherein the host television device receives at least one content service has a connector for attaching to the module. Java™ code is received from the content service being received by the host television device over the connector. An application execution engine residing on the external module carries out execution of the Java™ code.

Certain elements of the embodiments described herein, are or may be implemented using a programmed processor executing programming instructions that are broadly described above in flow chart form that can be stored on any suitable electronic or computer readable storage medium and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

Also, while certain embodiments herein were described in conjunction with specific circuitry that carries out the functions described, other embodiments are contemplated in which the circuit functions are carried out using equivalent software or firmware embodiments executed on one or more programmed processors. General purpose computers, microprocessor based computers, micro-controllers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware and/or dedicated processors.

While certain illustrative embodiments have been described, it is evident that many alternatives, modifications, permutations and variations will become apparent to those skilled in the art in light of the foregoing description.

What is claimed is:

1. A method of processing a boot sequence for a processor forming a part of a module apparatus, comprising:
   in the module apparatus communicatively coupled with a host television device:
      determining an operational environment supported by the host television device;
      determining a configuration of the module apparatus based on the operational environment supported by the host television device; and
      receiving a Java™ application code from the host television device, wherein the host television device received the Java™ application code from a content service;
      establishing a mode of operation based on the configuration of the module apparatus, wherein a Java™ application execution engine residing on the module apparatus executes the Java™ application code for the host television device based on the mode of operation; and
      returning data as an output to the host television device, wherein the data returned to the host television device comprises graphical information generated by the Java™ application execution engine for rendering on a television display.

2. The method according to claim 1, wherein the Java™ application execution engine comprises one or more of: an OpenCable Application Platform (OCAP) application engine or a Multimedia Home Platform (MHP) application execution engine.

3. The method according to claim 1, wherein the module apparatus comprises an external module that is connectable via a connector to the host television device.

4. The method according to claim 1, wherein the boot sequence of the processor comprises an interrogation of the host television device to determine whether the host television device is a Multi-stream host or a Single-stream host.

5. The method according to claim 1, further comprising transmitting content comprising one or more of: tuning, storage, usage, and trick-play commands generated by the Java™ application execution engine to the host television device.

6. The method according to claim 1, further comprising performing conditional access (CA) descrambling of content at the module apparatus.

7. The method according to claim 1, further comprising performing copy protection at the module apparatus on compressed content that is returned to the host television device.

8. The method according to claim 1, further comprising decompressing content at the module apparatus and sending a composite signal to the host television device.

9. The method according to claim 1, wherein the graphical information obtained from processing the Java™ application code is used as overlay data.

10. The method according to claim 1, further comprising the module apparatus booting as a Multi-stream card if the host television device is a Multi-stream host and as a Single-stream card if the host television device is a Single-stream host.

11. The method according to claim 1, further comprising the module apparatus determining if the host television device includes one or more of an IP connection or OpenCable Application Platform (OCAP) functionality, and establishes a mode of operation based on the determination.

* * * * *